United States Patent [19]

Imai et al.

[11] 4,313,870
[45] Feb. 2, 1982

[54] PROCESS FOR PRODUCING POLYCONDENSATES

[75] Inventors: Shozaburo Imai, Akashi; Haruo Suzuki, Ibaraki; Kuniaki Asai, Tondabayashi; Katsuji Ueno, Hirakata, all of Japan

[73] Assignee: Sumitomo Chemical Company, Limited, Osaka, Japan

[21] Appl. No.: 939,794

[22] Filed: Sep. 5, 1978

[30] Foreign Application Priority Data

Sep. 21, 1977 [JP] Japan ............................... 52-114042
Sep. 21, 1977 [JP] Japan ............................... 52-114043

[51] Int. Cl.³ ...................... C08G 85/00; C08G 63/06; C08G 69/06
[52] U.S. Cl. ............................... 260/40 R; 260/37 N; 528/128; 528/173; 528/176; 528/196; 528/212; 528/272; 528/309; 528/335; 528/342; 528/350; 528/353; 528/388
[58] Field of Search ............... 528/193, 176, 173, 196, 528/212, 272, 309, 335, 342, 350, 353, 388, 128; 260/37 N, 40 R

[56] References Cited

U.S. PATENT DOCUMENTS

| | | | |
|---|---|---|---|
| 3,379,696 | 4/1968 | Wiloth | 528/335 X |
| 3,562,206 | 2/1971 | Silverman et al. | 528/335 X |
| 3,637,595 | 1/1972 | Cottis et al. | 528/193 |
| 3,821,171 | 6/1974 | Beaton | 528/335 X |
| 3,969,325 | 7/1976 | Conciatori et al. | 528/353 |
| 3,987,015 | 10/1976 | Driscoll et al. | 528/342 |
| 4,067,852 | 1/1978 | Calundann | 528/193 |
| 4,080,317 | 3/1978 | Morawetz et al. | 528/275 |
| 4,146,702 | 3/1979 | Morris et al. | 528/193 |

*Primary Examiner*—Earl A. Nielsen
*Attorney, Agent, or Firm*—Stevens, Davis, Miller & Mosher

[57] ABSTRACT

In a method producing a polycondensate by bulk polycondensation of a monomer (or a reactant mixture) which is a fluid at the polycondensation temperature, an improvement which comprises carrying out the polycondensation until substantially the whole polycondensate becomes a solid polydispersion while continually applying a shearing force sufficient for maintaining the polycondensation system in polydispersed state at a temperature of below the sintering of the produced polycondensate but sufficiently high for allowing the polycondensation to proceed substantially.

10 Claims, No Drawings

PROCESS FOR PRODUCING POLYCONDENSATES

This invention relates to a bulk polycondensation process for producing solid polydispersed polymers. More particularly, it relates to a process for producing an intended polymer in the form of polydispersion by polycondensing a monomer (or a reactant mixture), which is fluid at the polymerization temperature, until a solid polydispersion is formed.

Conventionally known polycondensation processes include suspension polymerization, emulsion polymerization, interfacial polymerization, solution polymerization and bulk polymerization. Of these processes, the bulk polymerization may be said as the most rational one in view of the ability to omit aftertreatments such as, for example, removal of the solvent, washing of the polymer, or the like, and the load added to waste water disposal. However, since in the conventional bulk polymerization process, polymerization is usually carried out at a temperature at which the polymer melts and the molten polymer is drawn out of the reactor, the melt viscosity should be at most 5,000 poises and the application range of the process is limited. Thus, the process is not applicable to a polymerization system exhibiting a high viscosity at the polymerization temperature and the process is unsuitable for commercialization when the polymer is poor in thermal stability. In order to overcome the above difficulties, there has been proposed a process for producing a polyester, which comprises preparing at first a prepolymer having a reduced viscosity of 0.15 to 0.4 dl/g and then further polymerizing the prepolymer in the solid phase, as disclosed, for example, in Japanese patent application Kokai (Laid-Open) No. 54,690/76. According to the disclosure, polymerization is allowed to proceed to a stage in which the melt viscosity still allows the produced prepolymer to be easily drawn out of the reactor, then the prepolymer is discharged, cooled to crystallize (with grandual or rapid cooling or after addition of a crystallizing solvent), ground to pass through an about 20-mesh screen, and heated under a nitrogen atmosphere to increase the polymerization degree. In other examples, polymerization is carried out in the presence of a small amount of a solvent or an excess amount of the monomer to reduce the viscosity and the solvent or the excess monomer is removed after the polymerizate is discharged from the reactor. Such a procedure is undesirable because of operational complexity. There is also known a procedure in which the melt viscosity is reduced by elevating the polymerization temperature. In such a procedure, the polymerizate undergoes thermal decomposition or other adverse influences, resulting in promotion of discoloration of the polymer during polymerization or in deterioration of the physical properties which are required for practical service.

Regarding the production of aromatic polyesters by bulk polycondensation, there has been known a process for oxybenzoyl polyester as described in U.S. Pat. Nos. 2,728,747 and 2,600,376; Journal of Applied Polymer Science, Vol. 2, No. 5, 198–202 (1959); Japanese Patent Publication Nos. 6,796/71 and 37,357/73 and a process for producing a copolyester containing hydroxybenzoic acid as described in Japanese Patent Publication No. 47,870/72. According to, for example, the description in Journal of Applied Polymer Science, Vol. 2, No. 5 (1959) and Japanese Patent Publication No. 37,357/73, when polycondensation is carried out at 300° C. under reduced pressure, the melt viscosity of the polymerizate increases with the progress of polymerization until stirring becomes impossible. Upon cooling and solidification, the polymerization degree of the polymerizate no longer increases. Therefore, after cooling and solidification, the solidified polymerizate as such pulverized into grains of about 0.8 mm in diameter or immersed in acetone to promote crystallization is heated to increase the polymerization degree.

In conventional processes, as described above, it is a general concept that when bulk polymerization is carried out at a temperature higher than the melting point of an intended polymer, the polymerizate as a whole becomes a high-viscosity mass, whereas when it is carried out at a temperature below said melting point, the polymerizate as a whole becomes a solid block. Nevertheless, the present inventors surprisingly found out a polymerization process which enables the polymerization to proceed until substantially the entire polycondensate becomes a solid polydispersion which is easily dischargeable, by carrying out the polymerization at a temperature below the sintering temperature of the polymer while continually applying a shearing force to the polymerization system. In this manner, it is possible to allow the polymerization to proceed to a sufficiently high polymerization degree, while the polymerization system is maintained sufficiently fluid throughout the polymerization period. This process was found desirable because it is quite free from the troublesome operations involved in conventional processes, such as discharging the prepolymer from the reactor, grinding the prepolymer, and then subjecting the prepolymer to solid phase polymerization, or laborious discharge of a highly viscous bulk polymerizate.

An object of this invention is to provide a process capable of producing a polycondensate in powder or flake form directly from the monomer or reactant mixture.

Another object of this invention is to provide a process for producing an aromatic polyester in powder or flake form as discharged from a reactor.

According to this invention, there is provided an improvement in a method of producing a polycondensate by bulk polymerization of a monomer (or a reactant mixture), which is fluid at the polymerization temperature, which improvement comprises carrying out the polycondensation until substantially the whole polycondensate becomes a solid polydispersion while continually applying a shearing force sufficient for maintaining the polymerization system in polydispersed state at a temperature below the sintering temperature of the produced polycondensate but sufficiently high for allowing the polycondensation to proceed.

The term "sintering temperature" as herein referred to means a temperature at which partial welding together of the polycondensate particles in the form of solid polydispersion formed by the process of this invention begins to take place. The "solid polydispersion" means a form of dispersion such as powders or flakes.

In carrying out the process of this invention, the monomer or the reactant mixture used is a fluid, particularly a liquid, at the polymerization temperature, which may be a slurry containing a non-fluid portion of the monomer (or the reactant mixture), or may contain, if necessary, a solvent removable under reduced pressure during polymerization. Throughout the polymerization period, in which the polymerization system changes from a substantially liquid state to a solid polydispersion substantially as a whole, a high shearing force, that is, a high agitating force is applied to the polymerization system, while the polymerization temperature being preferably not substantially decreased. In is important that the shearing force is sufficiently high to yield a solid polydispersion. It is also important for the formation of a solid polydispersion that the polymerization temperature is below the sintering temperature. In the case where the polymerization temperature is elevated to promote the rate of polymerization, the object of this invention may be achieved by adjusting the rate of temperature elevation so that it is smaller than the rate of increase in sintering temperature with the progress of polymerization, while applying a shearing force sufficient for maintaining solid polydispersion.

The process of this invention is applicable to any of those polymerization systems which remain at a temperature below the sintering temperature of the polymer throughout the polymerization period involving the change of the system from a substantially liquid state to a solid polydispersion while being applied with a shearing force at the polymerization temperature. Particularly, preferable ones are those polymerization systems which, on polymerization while applying a shearing force, yield crystalline solid polydispersions having no tendency to agglomerate. The present process is suitable for producing a polymer having a melt visosity of high temperature dependence, because the solid polydispersion of such a polymer has little tendency to agglomerate.

The suitable polycondensation temperature is naturally a temperature at which polymerization substantially proceeds. It is generally in the range of about 0° to about 450° C., preferably about 100° to about 400° C., most preferably about 180° to about 400° C. Since the polymerization temperature varies depending on the type of reactants, presence or absence of a catalyst, etc., it is suitably selected by taking these factors into account in order to advantageously carry out the process of this invention. The present process is suitable also for a polycondensation system which increases in polymerization degree in the solid phase.

Although the present process is useful for producing general polycondensation resins which may be either thermoplastic or thermosetting, it is usually used largely in producing thermoplastic resins such as those polycondensates having, for example, ester, carbonate, ether, amide, imide, sulfone and sulfide linkages. Examples are polyamides, polyamide-imides, polyimides, polyesters, polyester-amides, polycarbonates, polyethers, polyoxydiazoles, polyamide-hydrazides, polybenzimidazoles, polyphenylenes, polysulfones and polysulfides. The present process is advantageously used in particular in polycondensation reactions with the removal of water, an alcohol, an acid (acetic acid, hydrochloric acid, etc.), glycol, or phenol.

The reactants for use in the present process are bifunctional compounds which are used each alone or in combinations similarly to the conventional polycondensations. In the case of polyamides for example, suitable diamines are aliphatic diamines such as hexamethylenediamine and decamethylenediamine, heterocyclic diamines such as methylenedi-1,4-cyclo-hexylenediamine and piperazine, and aromatic diamines such as m-phenylenediamine, p-phenylenediamine, diaminodiphenyl ether, and diaminodiphenylethane; and suitable dicarboxylic acids are aliphatic dicarboxylic acids such as succinic acid, mucic acid, adipic acid and sebacic acid, alicyclic dicarboxylic acids such as hexahydroterephthalic acid and hexahydroisophthalic acid, and aromatic dicarboxylic acids such as terephthalic acid, isophthalic acid, 2-methylterephthalic acid, 4-methylterephthalic acid, naphthalenedicarboxylic acid, diphenyldicarboxylic acid, diphenyl ether dicarboxylic acid, diphenoxyethanedicarboxylic acid and diphenylsulfonedicarboxylic acid. Esters such as, for example, phenyl ester and acid chlorides of above dicarboxylic acids are also included. Examples of self-polycondensing monomers are $\epsilon$-caprolactam, p-aminobenzoic acid, m-aminobenzoic acid, and esters thereof. These can be used in combinations of two or more. The present process can also be used in bulk polymerization using polycondensable derivatives of the above compounds such as salts, acetylated diamines, and phenyl esters of dicarboxylic acids. In such cases, the polycondensation proceeds with the removal of low-molecularweight compounds such as water, hydrochloric acid, acetic acid and phenol by distillation during the reaction. For polyamideimides, there are used the above-noted diamines and acid components such as trimellitic anhydride. For polyimides, there are used the above-noted diamines and acid components such as pyromellitic anhydride, diphenylketonepyromellitic anhydride, and butanetetracarboxylic anhydride.

For the production of polyesters according to this invention, suitable diols are aliphatic diols such as ethylene glycol, propylene glycol, trimethylene glycol, tetramethylene glycol and neopentyl glycol; alicyclic diols such as cyclohexanedimethylol; aliphatic diols having an aromatic ring in the molecule such as 2,2'-bis(4-$\beta$-hydroxyethoxyphenyl)-propane; compounds with two hydroxyl groups bonded directly to an aromatic ring such as, for example, resorcinol, hydroquinone, chlorinated hydroquinone, 2,2'-bis(4-hydroxyphenyl)propane, 1,1-bis(4-hydroxyphenyl)-cyclohexane, 1,1-bis(4-hydroxyphenyl)ethane, bis(4-hydroxyphenyl)methane, 2,2'-bis(4-hydroxy-3,5-dibromophenyl)propane, 2,2'-bis(4-hydroxy-3,5-dimethylphenyl)propane, 2,2'-bis(4-hydroxy-3,5-dichlorophenyl)propane, diphenol, bis(4-hydroxyphenyl)ether, bis(4-hydroxyphenyl) sulfide, bis(4-hydroxyphenyl) sulfone, and bis-(4-hydroxyphenyl)ketone. Derivatives of diols obtained by converting the hydroxyl groups into —OR groups (where R represents a lower alkanoyl group) are also usable. As dicarboxylic acid components, there may be used those listed above as acid components for use in polyamides. Examples of self-polycondensable polyester monomers are $\epsilon$-oxycaproic acid, hydroxybenzoic acid, 3,5-dimethyl-4-hydroxybenzoic acid, esters thereof, preferably phenyl esters, and derivatives of these compounds obtained by converting hydroxyl groups into —OR groups (where R represents a lower alkanoyl group). Compounds such as a copolymer of polyethylene terephthalate and p-hydroxybenzoic acid are also usable. Combinations of two or more compounds listed above may also be used.

The present process is applicable to the bulk polycondensation using the above compounds or, if necessary, polycondensable derivatives thereof obtained by various known methods and removing low-molecularweight compounds formed along with the progress of reaction, such as water, hydrochloric acid, acetic acid and phenol, to obtain high-molecular-weight polycondensates. It is also feasible to modify the polycondensate by introducing polyfunctional compounds such as, for example, cyanuric chloride, trimellitic acid and trihydroxybenzene. Conventional molecular weight regulating agents such as monofunctional compounds including monohydric alcohols, amines, phenols, etc. may be used.

The process of this invention is advantageously applied to the bulk polymerization for producing aromatic polyesters. Therefore, the invention is illustrated below in detail with reference to aromatic polyesters having the structure represented by the formula (I),

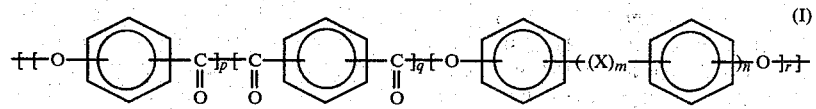
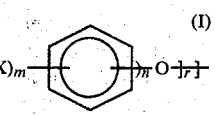

wherein X represents a hydrocarbon group having 1 to 20 carbon atoms, —O—, —SO$_2$—, —S— or —CO—, m is 0 or 1 and n is 0 or 1; when p=0, q=r=3–600; when q=r=0, p=3–600, preferably p=20–200, or p+q+r=3–600, preferably p+q+r=20–200, and q=r. The reaction scheme is represented by the following formula:

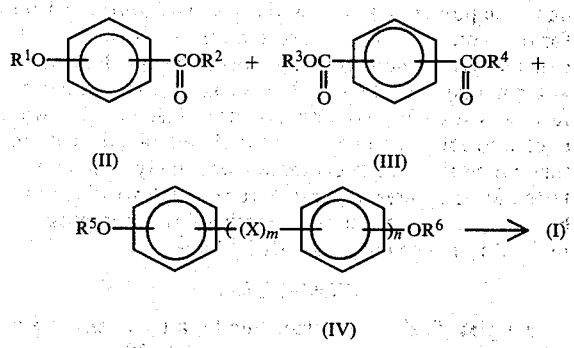

wherein m, n and X are as defined above, $R^1$, $R^5$ and $R^6$ each represents a benzoyl group, a lower alkanoyl group, or preferably a hydrogen atom and $R^2$, $R^3$ and $R^4$ each represents a hydrogen atom, a benzyl group, a lower alkyl group, or preferably a phenyl group. Examples of the compounds represented by the formula (II) are p-hydroxybenzoic acid, m-hydroxybenzoic acid, phenyl p-hydroxybenzoate, phenyl m-hydroxybenzoate, p-acetoxybenzoic acid, m-acetoxybenzoic acid, isobutyl p-acetoxybenzoate, 3,5-dimethyl-4-hydroxybenzoic acid, phenyl 3,5-dimethyl-4-acetoxybenzoate, and phenyl 3,5-dimethyl-4-hydroxybenzoate. Examples of the compounds represented by the formula (III) include isophthalic acid, terephthalic acid, 2-methylterephthalic acid, diphenyl terephthalate, diethyl isophthalate, methyl ethyl terephthalate, mono-isobutyl terephthalate, terephthaloyl chloride and isophthaloyl chloride. Examples of the compounds represented by the formula (IV) are hydroquinone, resorcinol, diacetoxyresorcinol, 4,4'-biphenol, 4,4'-oxybiphenol, 4,4'-thiobiphenol, 4,4'-dihydroxydiphenyl sulfone, chlorinated hydroquinone, 2,2'-bis(4-hydroxyphenyl)propane, 1,1-bis(4-hydroxyphenyl)cyclohexane, 1,1-bis(4-hydroxyphenyl)ethane, bis(4-hydroxyphenyl)methane, 2,2'-bis(4-hydroxy-3,5-dibromophenyl)propane, 2,2'-bis(4-hydroxy-3,5-dimethylphenyl)propane, 2,2'-bis(4-hydroxy-3,5-dichlorophenyl)propane, and bis(4-hydroxyphenyl) ketone.

The condensation of the above reactants is carried out preferably at about 180° to about 400° C. Since the rate of condensation reaction increases generally with the increase in temperature, it is desirable to carry out the condensation at comparatively higher temperatures. The allowable highest temperature depends partially upon the boiling point or decomposition point of the reactants used or of the low-molecular-weight polymer formed in the earlier stage of condensation. It is preferable to carry out the condensation at a relatively lower temperature in the earlier stage and at increasingly higher temperatures with the progress of condensation.

In the case of aromatic polyesters, condensation is carried out at 180° to 250° C. in the earlier stage, then the temperature is elevated, and the condensation is continued at 250° to 380° C., preferably 300° to 360° C., at atmospheric or reduced pressure. When a solid polydispersion has been formed, it is possible to further elevate the temperature while taking the sintering temperature and decomposition temperature into account, and the condensation is carried out at 310° to 400° C., preferably 310° C. to 380° C. in the final stage. The rate of polycondensation increases with the increase in reaction temperature unless the decomposition temperature or the sintering temperature of the polycondensate is exceeded.

The polymerization degree becomes higher with the progress of polycondensation.

Being a bulk polycondensation process, the present process provides a polymer requiring no purifying aftertreatment. Accordingly, it is desirable for the purpose of this invention to use no catalyst. However, in order to increase the rate of reaction, it is desirable to use a gaseous catalyst such as a Lewis acid for example, hydrogen chloride. If the catalyst residue has no adverse influence on the polymer, catalysts commonly used in polyamides, polyamide-imides or polyesters can be used.

In this invention, stabilizers, coloring agents, and fillers can be added to the polymerization system in accordance with the use of the product. As for the fillers in particular, the object of this invention may be achieved more easily by the addition of fillers to those polycondensation systems which difficultly form a solid polydispersion, because the addition of fillers inert to the polycondensation facilitates the formation of solid polydispersion from the polycondensate which is formed. Examples of the fillers which can be used in this invention are silica, quartz, fumed silica, silicon carbide, aluminum oxide, tin oxide, iron oxide, zinc oxide, carbon and graphite powder, sand, glass fiber, and pigments such as titanium oxide, other inorganic pigments, and heat-resistant organic pigments.

The process of this invention is characterized by carrying out three stages of polycondensation in a single reactor, said three stages consisting of an earlier stage where polycondensation proceeds in a substantially liquid monomer (or reactant mixture) of low viscosity, an intermediate stage where the viscosity increases with the progress of polycondensation and a later stage where substantially the whole polymerization system changes into a solid polydispersion under the applied shearing force by continued agitation. Since the polycondensate in the form of solid polydispersion thus formed is easily dischargeable from the reactor to obtain a final product, the present process may become a highly desirable production method. The agitation power to be applied in carrying out the reaction accompanying the above-noted change of state in three stages is preferably 0.75 to 100 KW/m$^3$. The agitation power can be properly determined according to the type of polycondensate and the like. A polycondensate of high crystallinity requires relatively small agitation power to achieve the object. When the polycondensation system reaches a stage where the molten polycondensate is transformed into a solid polydispersion, it is essential to apply a sufficient shearing force by agitation for keeping the system from aggregation. It is preferable in this stage to apply a sufficient shearing force so that the particle diameter of the resulting solid polydispersion may become as small as possible, e.g. 0.5 mm or less. For this purpose, the agitation power required can be suitably determined considering the type of polycondensate, agitator and the like.

In carrying out the process of this invention, the reactor is selected from those of the stirred vessel type provided with agitating devices usually used in high-viscosity liquid phase reactions, such as, for example, anchor type, multistage-anchor type, helical ribbon type, helical shaft type, and modifications thereof; mixers having a powerful kneading action, such as Werner mixer, Banbury mixer, pony mixer, muller mixer, and roll mill; and mixers which permit continous operation, such as Ko-Kneader, pug mill and gear compounder. Other mixers may of course be used.

The invention is illustrated below with reference to Examples which are merely illustrative and not limitative.

EXAMPLE 1

In a reactor provided with an agitator of the anchor type and having a narrow clearance between the reactor wall and the agitator blade, were placed 138 g of p-hydroxybenzoic acid, 170 g of phenyl acetate, 318 g of diphenyl terephthalate, and 500 g of o-dichlorobenzene. After introducing nitrogen into the reactor and heating the mixture to 180° C., hydrogen chloride was introduced in the reactant mixture. The mixture was stirred for 6 hours at 180° C., freed from acetic acid, and the introduction of hydrogen chloride was stopped. After addition of 111 g of hydroquinone and 100 g of o-dichlorobenzene, the temperature of the mixture was further elevated to remove the o-dichlorobenzene. At this stage, the torque increased. The temperature was raised from 220° C. to 320° C. taking a period of 10 hours, while the torque gradually decreased. Agitation was continued for 16 hours at 320° C., while the torque gradually increased. The temperature was raised to 340° C. and agitation was continued with increased agitation power for 2 hours, while the torque on the anchor blade further increased and then decreased. At this stage, on observation of the reactor contents, it was found that the molten mass had been changed into a powdery state. After a further one hour of continued polymerization, there was formed complete powder. The powder was cooled to 250° C. and discharged from the reactor. The quantity of the total distillate consisting of phenol, acetic acid, phenyl acetate and o-dichlorobenzene was 971 g and the powder recovered was 334 g (93% of the theoretical yield).

On differential thermal analysis, the powder showed a weak heat absorption at 405° C. and a strong heat absorption at 492° C. A sample (38 g) taken from the powder at the time of transformation from the molten state was ground to a fine powder which showed a sintering temperature of 381° C. The product powder was injection molded at 390° C. and tested for tensile properties. The tensile strength was 923 kg/cm$^2$ at room temperature and 253 kg/cm$^2$ at 260° C.

EXAMPLE 2

In a reactor provided with an agitator of the anchor type and having a narrow clearance between the reactor wall and the agitator blade, were placed 138 g of p-hydroxybenzoic acid, 332 g of isophthalic acid, 372 g of p,p'-biphenol, and 561 g of acetic anhydride. While introducing nitrogen, the agitator was operated and the mixture was refluxed at 150° C. for 2 hours. While removing the acetic acid by distillation, the temperature of the mixture was elevated to 250° C. when the acetic acid formed by acetylation had been almost completely distilled off. The temperature was kept at 250° C. for 2 hours and then elevated to 300° C. while the torque increased. When the temperature reached 300° C., the agitation power was increased and the mixture was kept for one hour at 300° C. when the torque showed a sudden increase. Thereafter, the torque again decreased. After having been kept at 300° C. for 2 hours, the mixture was transformed into powder. The powder was cooled to 250° C. and discharged. A sample taken at the time when the torque decreased was finely ground and tested for the sintering temperature which was found to be 373° C. The flexural strength of the compression molded test specimen was 701 kg/cm$^2$.

EXAMPLE 3

In a glass flask, were placed under a nitrogen stream 1,380 g of p-hydroxybenzoic acid and 1,120 g of acetic anhydride. The mixture was refluxed at 150° C. for 2 hours and then the temperature was raised while removing acetic acid by distillation. When the temperature reached 230° C., the p-acetoxybenzoic acid formed by acetylation was transferred into a double-arm kneader which had been heated to 230° C. At this stage, the p-acetoxybenzoic acid was liquid. While agitating at low speed, the temperature of this liquid was raised to 330° C. taking a period of one hour. When the temperature had reached 310° C., an increase in torque was observed. Polymerization was continued with increased speed of agitation until the mixture in the kneader was transformed into powder. 100 Grams of the powder were tested for particle diameter. It was found that 73% of the sample had a particle diameter of 0.1 mm or less. The polymerization was continued at 330° C. The degree of conversion when the polymerization system was transformed into a powder was 95%. After a further 2 hours of reaction, there were obtained 1,130 g of fine powder, corresponding to a yield of 94%. Ninety-one percent of the fine powder was found to have a particle diameter of 0.1 mm or less. On differential thermal analysis, the powder showed a heat absorption at 342° C. The loss on heating in the air at 370° C. for one hour was 0.65% by weight. The number average molecular weight was 11,000.

EXAMPLE 4

In a reactor provided with an agitator of the anchor type and having a narrow clearance between the reactor wall and the agitating blade, were placed 64.4 g of m-phenylenediamine, 56.7 g of diphenyl terephthalate, and 132.2 g of diphenyl isophthalate followed by the introduction of nitrogen. The temperature of the mixture was elevated to 260° C. while removing phenol. Then the temperature was further elevated to 300° C. taking a period of 3 hours, while the torque showed a gradual increase. Thirty minutes after the temperature had reached 300° C., the torque showed a sudden increase and on continued agitation a decrease. Thereafter, the mixture was kept at 300° C. for 2 hours when the polymerization system transformed into powder. The powder passing through a 20-mesh screen was polymerized in the solid phase under a nitrogen atmosphere at 300° C. for 3 hours, then at 330° C. for one hour. A 20 g portion of the powder thus treated was compression molded in a 50 φ mold at 350° C. for 7 minutes under pressure of 0.5 ton/cm². The molded specimen had a specific gravity of 1.36 and was tough.

In a manner similar to that described above, polycondensation was carried out using a m-phenylenediamine-p-phenylenediamine mixture or p-phenylenediamine alone on one hand and diphenyl terephthalate, diphenyl isophthalate, or a mixture thereof on the other. The polymerization system changed from the molten state to the powdery state, thus demonstrating the feasibility of the powder-forming polycondensation process of this invention.

EXAMPLE 5

In a reactor provided with an agitator of the multi-stage anchor type and having a narrow clearance between the reactor wall and the agitating blade, were placed 900 g of p-acetoxybenzoic acid, 675 g of p,p'-acetoxydiphenyl, 415 g of terephthalic acid, and as a filler, 930 g of powdered high-purity quartz which had been treated with γ-aminopropyltriethoxysilane. After the air in the reactor had been thoroughly replaced by nitrogen, the elevation of temperature was started. When the temperature reached 230° C., the p-acetoxybenzoic acid and p,p'-acetoxydiphenyl both melted and the mixture was in the form of slurry. At this stage, the mixture was thoroughly agitated and the temperature was elevated. Acetic acid began to form and polymerization started. When it reached 330° C., the temperature was kept constant and the polymerization was continued. After about 3 hours, as the torque began to increase, the agitating speed was increased while the polymerization was continued. After about 5 hours, the torque began to decrease and the polymerization system changed into a powdery state. After a further 3 hours of polycondensation, the temperature was elevated and the polycondensation was continued for 2 hours at 350° C., then for one hour at 370° C. to complete the polymerization. After cooling to 250° C., the resulting powder was discharged. The powder was pelletized and injection molded. The tensile strength of the molded piece was 750 kg/cm².

What is claimed is:

1. In a method for producing a polycondensate by a bulk polycondensation of a monomer (or a reactant mixture) which is a fluid at the polycondensation temperature, an improvement which comprises carrying out the polycondensation until substantially the whole polycondensate becomes a solid polydispersion while continually applying a shearing force sufficient for maintaining the polycondensation system in polydispersed state at a temperature below the sintering temperature of the produced polycondensate but sufficiently high for allowing the polycondensation to proceed substantially.

2. A method according to claim 1, wherein the polycondensate is one member selected from the group consisting of polyamides, polyamide-imides, polyimides, polyesters, polyester-amides, polycarbonates, polyoxazoles, polyamine hydrazides, polybenzimidazoles, polyphenylenes, polysulfones, and polysulfides.

3. A method according to claim 2, wherein the polyester is an aromatic polyester represented by the general formula

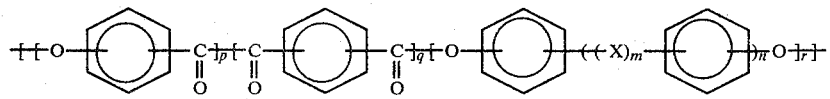

wherein X is a hydrocarbon group having 1 to 20 carbon atoms, —O—, —SO$_2$—, —S—, or —CO—, m is 0 or 1, n is 0 or 1; when p=0, q=r=an integer of 3 to 600, when q=r=0, p=an integer of 3 to 600; when p≠0, q≠0 and r≠0, p+q+r=3 to 600; p, q, and r are positive integers and q=r.

4. A method according to claim 3, wherein the aromatic polyester is a polyester obtained by the polycondensation of the monomer (II), a mixture of the monomers (III) and (IV), or a mixture of the monomers (II), (III) and (IV):

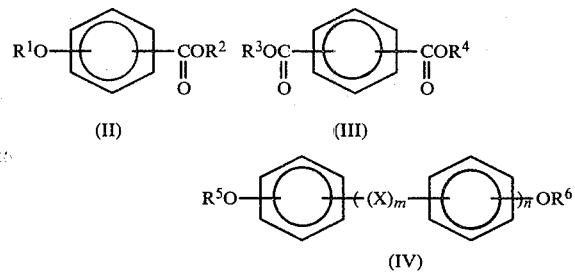

wherein each of $R^1$, $R^5$ and $R^6$ is a benzoyl group, lower alkanoyl group, or hydrogen atom; each of $R^2$, $R^3$ and $R^4$ is a hydrogen atom, benzyl group, lower alkyl group, or phenyl group; X is a hydrocarbon group having 1 to 20 carbon atoms, —O—, —SO$_2$—, —S—, or —CO—; m is 0 or 1 and n is 0 or 1, wherein said monomers (III) may also be a member selected from the group consisting of terephthaloyl chloride and isophthaloyl chloride.

5. A method according to claim 1, wherein the polycondensation is carried out at a temperature of 0° to 400° C.

6. A method according to claim 5, wherein the polycondensation is carried out at a temperature of 180° to 400° C.

7. A method according to claim 1, wherein the shearing force applied to the polycondensation system is produced by the agitation power of 0.75–100 KW/m³.

8. A method according to claim 1, wherein the polycondensation is carried out in the presence of a filler.

9. A method according to claim 8, wherein the filler is at least one member selected from the group consisting of silica, quartz, fumed silica, silicon carbide, aluminum oxide, tin oxide, iron oxide, zinc oxide, carbon, and graphite powder, sand, and glass fiber.

10. A method according to claim 4, wherein the polycondensed monomers are p-hydroxybenzoic acid, isophthalic acid, and p,p'-bisphenol.

* * * * *

REEXAMINATION CERTIFICATE (2916th)

United States Patent [19]

Imai et al.

[11] B1 4,313,870

[45] Certificate Issued Jun. 18, 1996

[54] PROCESS FOR PRODUCING POLYCONDENSATES

[75] Inventors: Shozaburo Imai, Akashi; Haruo Suzuki, Ibaraki; Kuniaki Asai, Tondabayashi; Katsuji Ueno, Hirakata, all of Japan

[73] Assignee: Sumitomo Chemical Company, Ltd., Osaka, Japan

Reexamination Requests:
No. 90/002,751, Jun. 11, 1992
No. 90/003,380, Mar. 30, 1994
No. 90/003,415, Apr. 21, 1994

Reexamination Certificate for:
Patent No.: 4,313,870
Issued: Feb. 2, 1982
Appl. No.: 939,794
Filed: Sep. 5, 1978

[30] Foreign Application Priority Data

Sep. 21, 1977 [JP] Japan ............................. 52-114042
Sep. 21, 1977 [JP] Japan ............................. 52-114043

[51] Int. Cl.$^6$ ............... C08G 85/00; C08G 63/06; C08G 69/06
[52] U.S. Cl. ............... 524/783; 524/783; 524/784; 524/785; 524/786; 524/789; 524/876; 523/1; 528/128; 528/173; 528/176; 528/196; 528/212; 528/272; 528/308.3; 528/308.8; 528/335; 528/342; 528/350; 528/353; 528/388
[58] Field of Search ............... 528/128, 173, 528/176, 196, 212, 272, 309, 335, 342, 350, 353, 388; 524/783, 784, 785, 786, 789, 876; 523/1

[56] References Cited

U.S. PATENT DOCUMENTS

| | | | |
|---|---|---|---|
| 3,213,066 | 10/1965 | Renfrew | 528/314 |
| 3,254,053 | 5/1966 | Fisher et al. | 528/41 |
| 3,544,280 | 12/1970 | Thomas | 422/134 |
| 3,753,957 | 8/1973 | Jones | 528/331 |
| 3,767,621 | 10/1973 | Suzuki et al. | 528/206 |
| 3,799,917 | 3/1974 | Rathke | 526/88 |
| 3,843,591 | 10/1974 | Hedrick et al. | 292/7 |
| 3,875,116 | 4/1975 | Heath et al. | 528/208 |
| 3,903,042 | 9/1975 | Gall | 524/538 |

FOREIGN PATENT DOCUMENTS

1341446 7/1971 United Kingdom.

OTHER PUBLICATIONS

Grant & Hackh's Chemical Dictionary Containing the Words Generally Used in Chemistry, and Many of the Terms Used in the Related Sciences of Physics, etc., Grant et al., McGraw–Hill Book Company.
Hawley's Condensed Chemical Dictionary, Eleventh Edition, Van Nostrand Reinhold Company, New York.
Polymer Chemistry for Chemical Patent Examiners (Kight, III), 1974.
Textbook of Polymer Science, Fred W. Billmeyer, Jr., Interscience Publishers.
Principles of Polymer Chemistry, by Paul J. Flory, Cornell University Press, Ithaca, New York, 1953.
Polymer Chemistry An Introduction, Malcolm P. Stevens, University of Hartford, Addison–Wesley Publishing Company, Inc., 1975.
Polymerization Processes, Calvin E. Schildknecht, John Wiley & Sons, 1977.
Natural and Synthetic Polymers, Henry I. Bolker, Marcel Dekker, Inc., New York.
Mixing Theory and Practice, Joseph B. Gray, vol. II, Academic Press, 1967.
Principles of Polymer Systems, Rodriguez I, McGraw–Hill Book Company.
Principles of Polymer Systems, Third Edition, Rodriguez II.

*Primary Examiner*—Sam A. Acquah

[57] ABSTRACT

In a method producing a polycondensate by bulk polycondensation of a monomer (or a reactant mixture) which is a fluid at the polycondensation temperature, an improvement which comprises carrying out the polycondensation until substantially the whole polycondensate becomes a solid polydispersion while continually applying a shearing force sufficient for maintaining the polycondensation system in polydispersed state at a temperature of below the sintering of the produced polycondensate but sufficiently high for allowing the polycondensation to proceed substantially.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *